United States Patent [19]
Liu

[11] Patent Number: 5,772,527
[45] Date of Patent: Jun. 30, 1998

[54] GOLF CLUB HEAD FABRICATION METHOD

[75] Inventor: Jung Ming Liu, Kaohsiung, Taiwan

[73] Assignee: Linphone Golf Co., Ltd., Kaoshiung, Taiwan

[21] Appl. No.: 846,487

[22] Filed: Apr. 24, 1997

[51] Int. Cl.⁶ .............................. A63B 53/04; B29C 45/03
[52] U.S. Cl. ........................ 473/324; 473/409; 473/332; 473/342; 264/45.1; 264/297.2; 264/328.1
[58] Field of Search ..................................... 473/324, 342, 473/345, 327, 332, 329, 409; 264/45.1, 259, 297.2, 328.1, 572

[56] References Cited

U.S. PATENT DOCUMENTS

| | | | |
|---|---|---|---|
| 2,429,351 | 10/1947 | Fetterolf | 473/329 |
| 4,027,885 | 6/1977 | Rogers | 473/342 |
| 4,398,965 | 8/1983 | Campau | 473/329 |
| 4,523,759 | 6/1985 | Igarashi | 473/329 |

*Primary Examiner*—Sebastiano Passaniti
*Attorney, Agent, or Firm*—Pro-Techtor International Services

[57] ABSTRACT

A golf club head fabrication method including the steps of i) preparing a rubber mixture and pre-warming it in a material tank of an injection molding machine; ii) preparing a club head casing having a front open chamber, a top filling hole and an inside flange within the front open chamber, then welding a face panel to the inside flange to close the front open chamber, and then filling a bonding agent through the filling hole into the front open chamber, and then pre-heating the club head casing; and iii) injecting the pre-warmed rubber mixture into the filling hole to mold a shock absorbing rubber layer in the front open chamber of the club head casing through a vulcanization process.

7 Claims, 3 Drawing Sheets

GOLF CLUB HEAD FABRICATION METHOD

BACKGROUND OF THE INVENTION

The present invention relates to a golf club head fabrication method, and more particularly to a method of molding a shock absorbing rubber layer in a golf club head.

A variety of materials are developed and used for adhering to the face panel of a golf club head to improve its striking efficiency. However, when a golf club head hits the ball, shocks are produced and transmitted from the golf club head to the user's hands through the shaft of the golf club, thereby causing the user's hands to ache. In order to prevent this problem, a shock absorbing rubber or like material may be bounded to a back recess of the golf club head to absorb shocks. However, the shock absorbing rubber tends to fall from the back recess of the golf club a certain length of time after use. Furthermore, adhering the shock absorbing rubber to the back recess of the golf club head consumes much labor, and the control of the installation quality of the shock absorbing rubber is another problem to be considered.

SUMMARY OF THE INVENTION

It is one object of the present invention to provide a golf club head fabrication method which can effectively fabricate shock absorbing golf club heads. It is another object of the present invention to provide a golf club head fabrication method which is simple and efficient to perform. According to the present invention, the golf club head fabrication method includes a first step of preparing a rubber mixture and pre-warming it in a material tank of an injection molding machine, a second step of preparing a club head casing having a front open chamber, a top filling hole and an inside flange within the front open chamber, then welding a face panel to the inside flange to close the front open chamber, and then filling a bonding agent through the filling hole into the front open chamber, and then pre-heating the club head casing, and a third step of injecting the pre-warmed rubber mixture into the filling hole to mold a shock absorbing rubber layer in the front open chamber of the club head casing through a vulcanization process.

DETAILED DESCRIPTION OF THE PREFERRED EMBODIMENT

Figure 1:
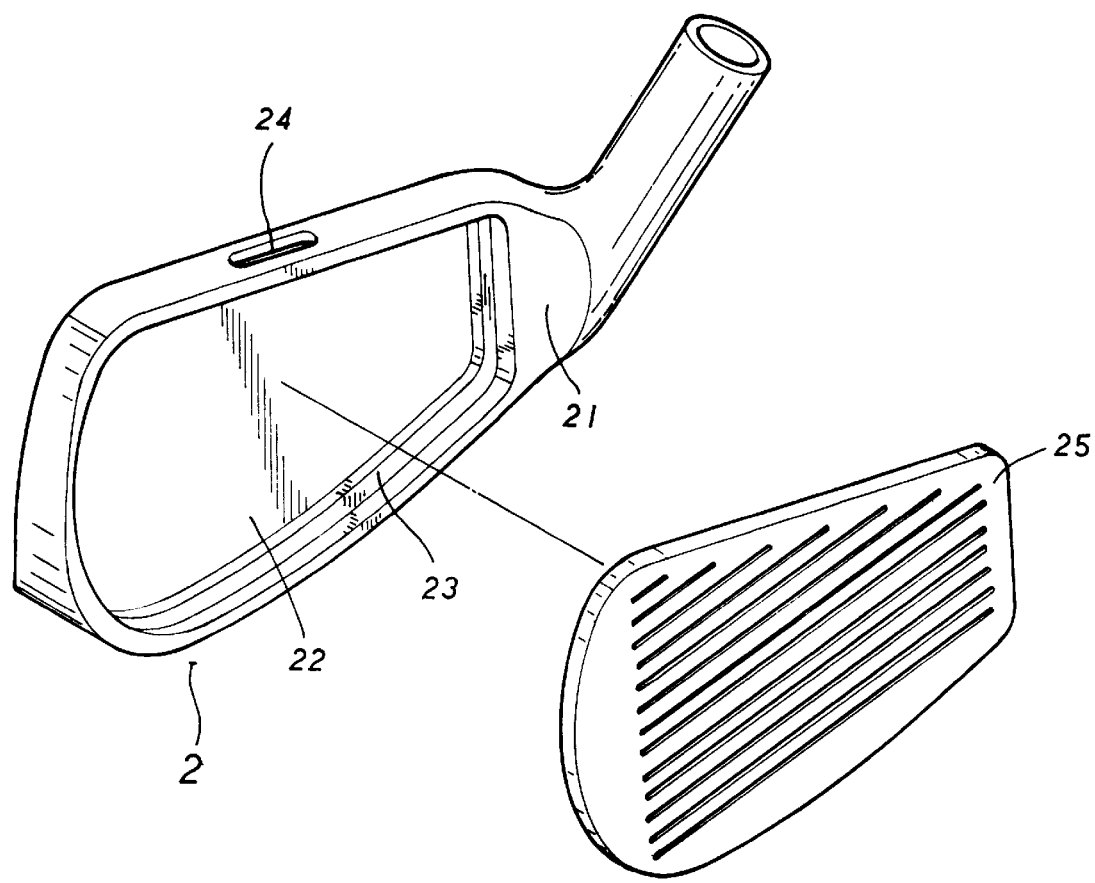
FIG. 1 is an exploded view of a club head casing and a face panel according to the present invention.
Figure 2:
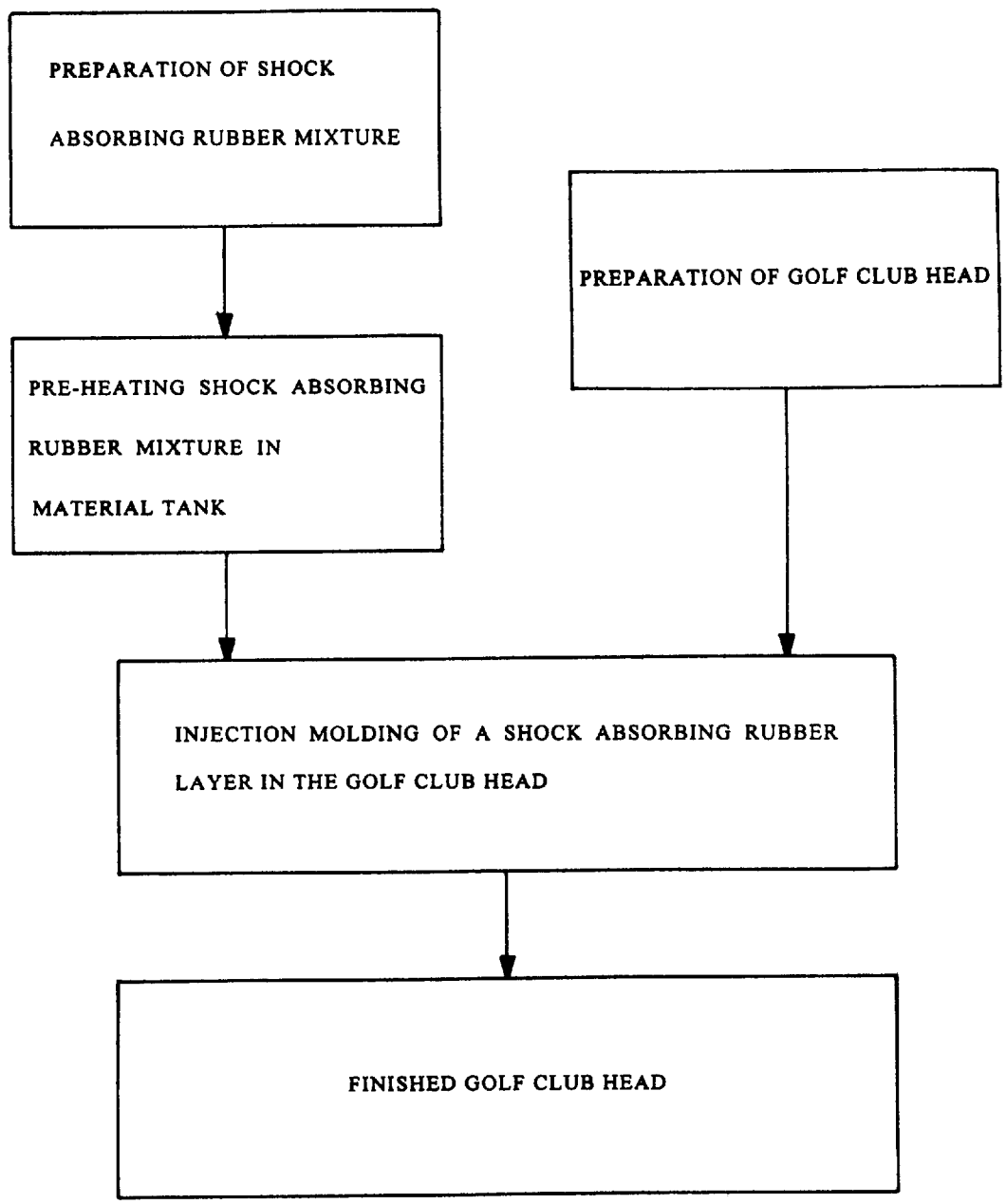
FIG. 2 is a golf club head fabrication flow chart according to the present invention.
Figure 3:
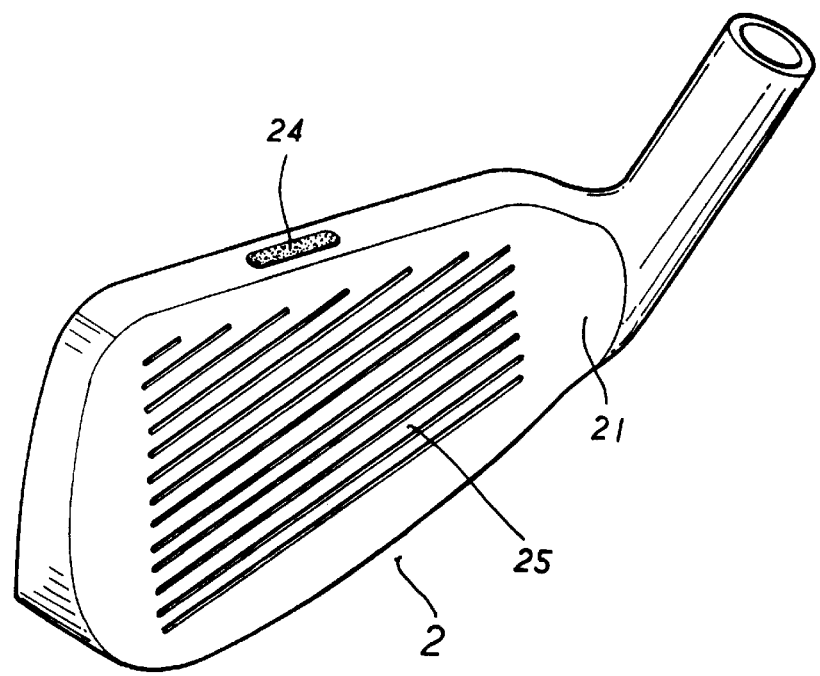
FIG. 3 is an elevational view of a finished golf club head according to the present invention.
Figure 4:
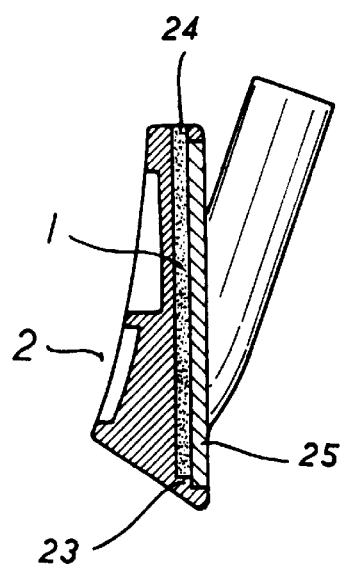
FIG. 4 is a sectional view of the finished golf club head shown in FIG. 3.

Referring to FIGS. 1 and 2, shock absorbing material and fillers are well mixed, then the rubber mixture is delivered to a material tank of an injection molding machine and pre-warmed to a temperature of about 60° C., and then the pre-warmed rubber mixture is delivered to an injection molding tube of the injection molding machine and heated to a temperature of about 70° C. The shock absorbing material can be a rubber for example ethylene propylene rubber. The fillers include white carbon, calcium carbonate, paraffin oil, zinc oxide, stearic acid, diphenyl-cresyl phosphate, and pigment. A club head casing 2 is prepared having a front open chamber 22 at its front side 21, a filling hole 24 at its top side in communication with the front open chamber 22, and an inside flange 23 raised from the bottom side of the front open chamber 22 around the border. A face panel 25 is welded to the inside flange 23 of the club head casing 2 and covered over the front open chamber 22 in flush with the front side 21 of the club head casing 2. A bonding agent is then filled through the filling hole 24 into the front open chamber 22 of the club head casing 2, and then the club head casing 2 is pre-heated at a temperature of about 100° C. for about 480 seconds. The club head casing 2 is then fastened to the injection molding mold and attached to a nozzle at one end of the injection molding tube of the injection molding machine, permitting the pre-heated rubber mixture to be injected into the filling hole 24 to fill up the front open chamber 22 of the club head casing 2. After vulcanization, a shock absorbing rubber layer 1 is formed in the finished golf club head (see FIGS. 3 and 4).

The aforesaid rubber mixture preferably contains by weight 500 parts of ethylene propylene rubber, 300 parts of white carbon, 300 parts of calcium carbonate, 50 parts of paraffin oil, 40 parts of zinc oxide, 35 parts of stearic acid, 80 parts of diphenyl-cresyl phosphate, and a predetermined amount of pigment. The injection molding temperature of the injection molding machine is set at about 185° C., the injection velocity is set at about 3.0cm/sec, the injection pressure is set at about 100kg/cm$^2$, the mold closing pressure is set at about 150kg/cm$^2$, the injection time is set about within 10 seconds to 30 seconds. After injection, the injected rubber mixture must be vulcanized in the club head casing 2 for about 240 seconds. After vulcanization, the finished club head can then be detached from the mold.

As indicated above, a finished club head has a shock absorbing rubber layer 1 bonded on the inside which effectively absorb shocks when the club head hits the ball. Because the injection molding procedure takes about 730 seconds to 750 seconds (about 480 seconds for preheat of the club head casing, about 10 to 30 seconds for injection of rubber mixture, and about 240 seconds for vulcanization), the method of the present invention is efficient.

What the invention claimed is:

1. A golf club head fabrication method including the steps of:

i) preparing a rubber mixture by mixing a rubber with fillers, then pre-warming the rubber mixture thus obtained in a material tank of an injection molding machine at a temperature of about 60° C., and then delivering the pre-warmed rubber mixture to an injection molding tube of the injection molding machine which is heated to a temperature of about 70° C.;

ii) preparing a club head casing having a front open chamber at its front side, a filling hole at one side in communication with said front open chamber, and an inside flange raised from a bottom side of said front open chamber around the border, then welding a face panel to the inside flange of said club head casing to close said front open chamber, and then filling a bonding agent through said filling hole into said front open chamber, and then pre-heating said club head casing at a temperature of about 100° C. for about 480 second; and iii) injecting said pre-warmed rubber mixture into said filling hole by said injection molding machine at an injection velocity of about 3.0 cm/sec, an injection pressure of about 100 kg/cm$^2$, a mold closing pressure of about 150 kg/cm$^2$, and an injection time of about within 10 seconds to 30 seconds, to mold a shock absorbing rubber in said front open chamber through a vulcanization process.

2. The golf club head fabrication method of claim 1 wherein said shock absorbing rubber is ethylene propylene rubber.

3. The golf club head fabrication method of claim 1 wherein said fillers include white carbon, calcium carbonate, paraffin oil, zinc oxide, stearic acid, diphenyl-cresyl phosphate, and pigment.

4. The golf club head fabrication method of claim 1 wherein said rubber mixture preferably contains by weight 500 parts of ethylene propylene rubber, 300 parts of white carbon, 300 parts of calcium carbonate, 50 parts of paraffin oil, 40 parts of zinc oxide, 35 parts of stearic acid, 80 parts of diphenyl-cresyl phosphate, and a predetermined amount of pigment.

5. The golf club head fabrication method of claim 1 wherein the injection molding temperature of said injection molding machine is set at about 185° C.

6. The golf club head fabrication method of claim 1 wherein the vulcanizing time of said vulcanization process is about 240 seconds.

7. The golf club head fabrication method of claim 1 wherein said filling hole is disposed at a top side of said club head casing.

\* \* \* \* \*